May 1, 1962 O. HORNING 3,031,837
SPRING WINDING MECHANISM FOR CLOCKS
Filed July 6, 1959
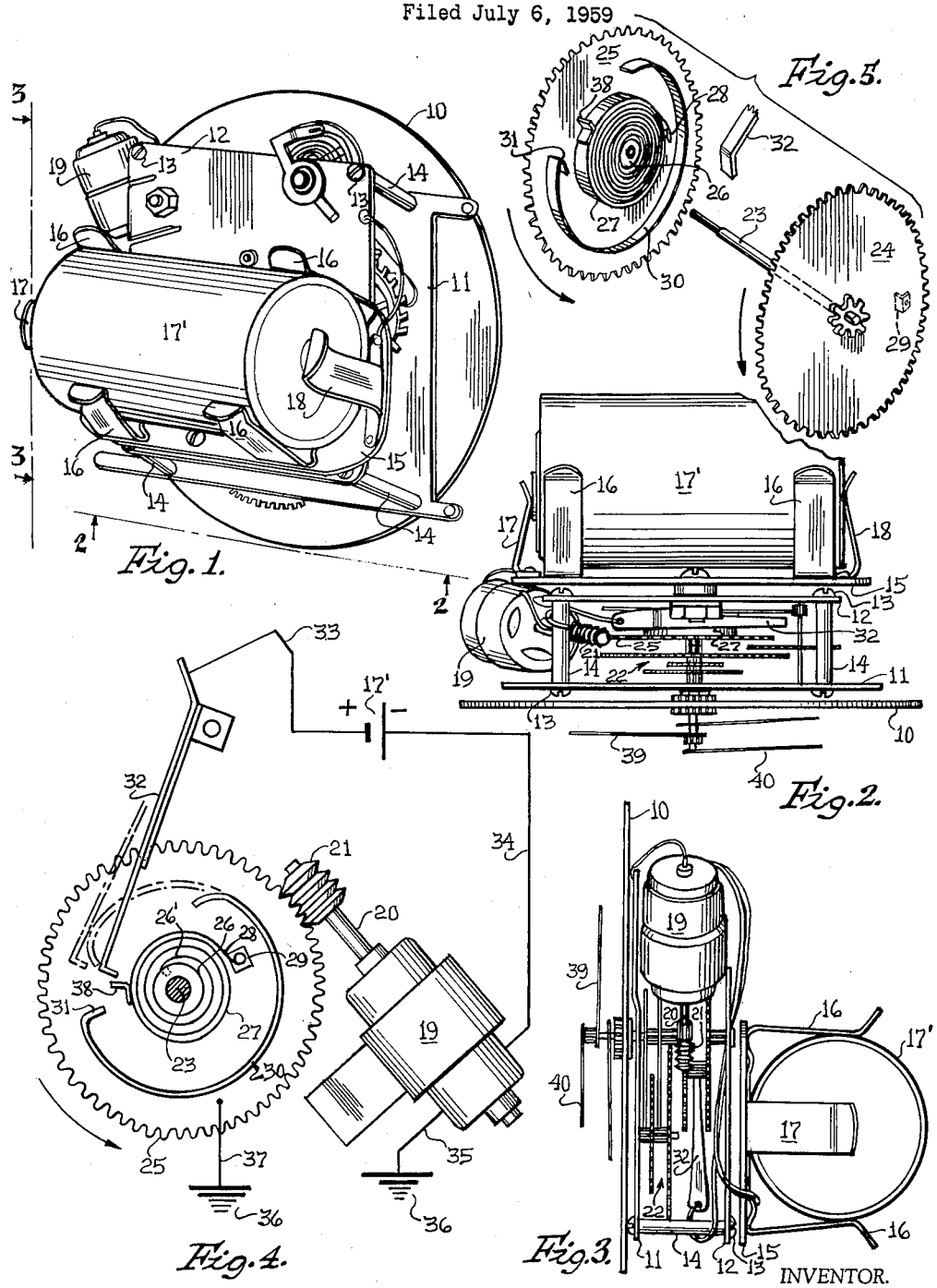
INVENTOR.
OLIVER HORNING
BY
Threedy & Threedy
HIS ATTORNEYS.

United States Patent Office 3,031,837
Patented May 1, 1962

3,031,837
SPRING WINDING MECHANISM FOR CLOCKS
Oliver Horning, Chicago, Ill., assignor to Rubber Products, Inc., Chicago, Ill., a corporation of Illinois
Filed July 6, 1959, Ser. No. 825,298
2 Claims. (Cl. 58—41)

This invention relates to a new and useful improvement in a spring winding mechanism for clocks and more particularly to a battery operated self-winding clock.

An object of my invention is in the provision of a clock of this character which has a means for winding a power spring for driving an escapement mechanism of a battery powered clock.

Another object of my invention is in the provision in a clock of this character of an automatic circuit switch for a battery operated clock.

Yet, another object of my invention is in the provision in a clock of this character of a spring driven switch element for connecting a spring winding gear of the clock to a battery operated motor.

A further object of my invention is in the provision in a clock of this character of an arrangement of parts whereby the battery power is used intermittently to wind the power spring and drive the hand mechanisms of such clock.

Yet, a further object of my invention is in the provision in a clock of this character of an arrangement of parts which permits the use of various designs while permitting the employment of a more rugged and broadly tolerant mechanism wherein the power spring drives the escapement mechanism, and the battery operated motor intermittently drives the hand mechanism.

Other objects will appear hereinafter.

The invention consists in the novel combination and arrangement of parts to be hereinafter described and claimed.

The invention will be best understood by reference to the accompanying drawings showing the preferred form of construction and in which:

FIG. 1 is a rear elevational view of my battery powered clock;

FIG. 2 is a bottom plan view of my clock;

FIG. 3 is a side elevational view of my battery powered clock;

FIG. 4 is a schematic diagram showing the electrical circuit and components of my clock; and FIG. 5 is a fragmentary exploded view of certain parts of my clock mechanism.

My improved battery operated clock includes the arrangement of certain structure whereby the power spring will drive the normal escapement mechanism of my clock while a periodically actuated switch will connect a suitable motor to a power source supplied by a dry-cell battery for directly moving the hand mechanisms of my clock.

Referring to FIG. 1 I show a face plate 10. This face plate 10 is mounted on a front wall 11 of a clock mechanism support. A rear wall 12 is fixedly connected to the front wall 11 by means of screws 13 or the like and spacer sleeves 14. Mounted on the rear wall 12 by a nut and bolt arrangement is a mounting plate 15. This mounting plate provides two sets of spaced apart spring fingers 16 which normally frictionally hold therebetween a battery 17'. Carried by the bracket 15 are contact members 17 and 18 for operatively connecting the opposite ends of the battery in a suitable electrical circuit. A small D.C. motor 19 is fixedly carried between the front wall 11 and the rear wall 12 adjacent one corner thereof as shown in FIGS. 1, 2 and 3. This motor 19 provides a driven shaft 20 which carries a suitable worm gear 21 on the end thereof.

Between the front wall 11 and the rear wall 12 is positioned the normal train of clock gears 22. This train of gears 22 is journaled upon a shaft 23 that is connected to a drive gear 24 and which extends laterally from one side thereof as shown in FIG. 5. Journaled on the shaft 23 and in spaced relation to the drive gear 24 is a spring winding gear 25. This spring winding gear 25 provides a central bushing 26 which has connected thereto one end 26' of a power spring 27. The opposite end 28 of the power spring is fixedly connected to a lug 29 mounted on the confronting face of the drive gear 24. Thus, it is clearly apparent that the drive gear 24 and the spring winding gear 25 are operatively connected together through the power spring 27. The spring winding gear has formed on its confronting face a laterally extending contact band 30. The ends of such band 30 terminate short of each other as shown in FIGS. 4 and 5. One end of the contact band 30 is bent in the direction of the power spring to provide a stop member 31 the purpose and function of which will hereinafter be made apparent.

Carried by the rear wall 12 is a contact arm 32. This arm is adapted to have one end thereof extend between the drive gear 24 and the spring winding gear 25 in the manner schematically shown in FIG. 4. One end of the contact arm 32 is connected by a suitable conductor 33 to one side of the battery 17'. The opposite side of the battery by a suitable conductor 34 is connected to the motor 19. The motor 19 by a suitable conductor 35 is connected to a common ground 36 which in this case may be the rear wall 12. The spring winding gear 25 together with the power spring 27 are connected by a suitable conduit 37 to the common ground 36.

In the manufacture of the clock mechanism the power spring 27 will be wound to a predetermined tension. The spring winding gear 25 having operative connection to the worm gear 21 on the shaft 20 of the motor 19 will be held in a fixed position. The power spring 27 will attempt to unwind itself about the shaft 23 and in so doing by reason of its connection to the drive gear 24 will cause such drive gear to rotate. The drive gear 24 is operatively connected to the normal escapement mechanism of the clock and it therefore follows that it is the unwinding action of the power spring 27 which indirectly drives such escapement mechanism. Fixedly carried on the outer surface of the last coil of the power spring 27 is a switch contact finger 38. As the power spring 27 unwinds this contact finger 38 will move into engagement with the free end of the contact arm 32 and complete a circuit to the motor 19. Upon energization of the motor 19 the shaft 20 together with worm gear 21 will be caused to rotate. By the worm gear's connection to the spring winding gear 25 such gear will be caused to rotate in the direction of the arrow as shown in FIG. 4. As the gear 25 rotates the contact band 30 will be moved into the position shown in dotted lines in FIG. 4 where it engages the contact arm 32 and maintains the circuit to the motor 19 until the free end of the contact arm 32 drops off the stop 31 of the contact band 30.

The cycle of the winding gear 25 will through the normal clock gear train 22 cause the minute hand 39 to rotate over the face 10 of the clock to indicate the passing of one minute.

By such motor driven rotation of the spring winding gear 25, it is readily apparent that the power spring 27 is maintained wound about the shaft 23. During the power winding of the spring 27 by the motor 19 and when the contact arm 32 is riding on the contact band 30, the contact finger 38, because of the increased winding tension of the spring 27 about the shaft 23, will be moved to a normal starting position which is slightly beyond the end of the contact arm 32 as it drops off the end of the contact band 30. Immediately the spring 27 will begin to unwind itself about the shaft 23 in the direction of the arrow in FIG. 4, causing the finger 38 to travel through a cycle until it again engages the arm 32 and initially energizes the motor 19. The rotation of the drive gear 24 is constant because of the coiled tension of the power spring 27 and the motor driven method as hereinbefore described employed to maintain such coil tension in the spring 27. It is also apparent that the electrical current supplied by the battery 17 is used intermittently to actuate the motor 19.

In the event that the battery or circuit therefore fails when the contact finger 38 engages the end of the contact arm 32 the spring 27 will be prevented from continuously unwinding as the ends of the contact finger 38 and the contact arm 32 remain engaged.

In the event that the battery 17 fails while the contact arm 32 is in engagement with contact band 30, the contact finger 38 will continue to rotate as the power spring 27 unwinds about the shaft 23 and in so doing increases its diameter until the finger 38 has moved outwardly with respect to the shaft 23 so that it will engage the stop 31 formed at one end of the contact band 30 at which point the power spring 27 will be prevented from uncoiling itself about the shaft 23.

It may be desirous to adapt a second hand 40 on the free end of the shaft 23 and as such as the drive gear 24 is caused to rotate by the unwinding of the power spring 27 it will move such second hand 40 over the face 10 of the clock.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim is new and desire to protect by Letters Patent is:

1. A clock of the class described comprising a shaft, a driving gear on said shaft, a second gear on said shaft, a power spring having one end connected to the driving gear and an opposite end connected to said second gear, a semi-circularly shaped contact band concentric with respect to the power spring and carried by and extending laterally from the second gear and having its opposite end portions in spaced relation with respect to each other, a motor having a power circuit, a worm gear providing driving connection between the motor and said second gear, a switch arm, a contact finger on said spring adapted to engage said switch arm in said power circuit for initially energizing said motor, and said switch arm in said power circuit being adapted to engage the peripheral surface of the band at a predetermined point in the cycle of rotation of said second gear by said motor to maintain energization of said power circuit to energize said motor for rotating said second gear in the same direction of rotation as said driving gear which is rotated by said power spring to restore the tension of said power spring.

2. A clock of the class described comprising a shaft, a driving gear fixedly carried by said shaft, a second gear freely journaled on said shaft in spaced relation to said driving gear, a power spring having one end connected to said second gear and its opposite end connected to said driving gear and adapted to rotate said driving gear in one direction, a semi-circularly shaped contact band concentric with respect to the power spring and carried by and extending laterally from said second gear and having its opposite end portions in spaced relation with respect to each other, a battery power motor including an electric power circuit, a worm gear providing driving connection between said battery powered motor and said second gear, a switch arm, a contact finger on said spring adapted to engage said switch arm in said electric power circuit for initially energizing said battery powered motor to cause said worm gear to rotate said second gear in said one direction, and said switch arm in said powered circuit being adapted to engage the peripheral surface of said band at a pre-determined point in the cycle of rotation of said second gear by said worm gear and said motor, to maintain energization of the power circuit for a pre-determined period to restore said power spring to a pre-determined tension.

References Cited in the file of this patent

UNITED STATES PATENTS

| | | |
|---|---|---|
| 362,902 | Pond | May 10, 1887 |
| 984,008 | Kallenbach | Feb. 14, 1911 |
| 1,012,010 | Powers | Dec. 19, 1911 |
| 1,605,674 | Manheim | Nov. 2, 1926 |

FOREIGN PATENTS

| | | |
|---|---|---|
| 153,911 | Germany | Aug. 2, 1904 |
| 301,868 | Switzerland | Dec. 1, 1954 |